United States Patent [19]
Venkidu et al.

[11] Patent Number: 5,623,274
[45] Date of Patent: Apr. 22, 1997

[54] FRONT-PANEL INDICATOR USING A SERIAL LINK FOR A PC

[75] Inventors: Arockiyaswamy Venkidu, Milpitas; Larry Jones, Palo Alto; Sreenath Mambakkam, San Jose, all of Calif.

[73] Assignee: OnSpec Electronic, Inc., Santa Clara, Calif.

[21] Appl. No.: 390,680

[22] Filed: Feb. 17, 1995

[51] Int. Cl.$^6$ ............................................ G09G 3/04
[52] U.S. Cl. .................................. 345/34; 361/683
[58] Field of Search ............................ 364/184, 185, 364/186, 188, 146; 345/33, 34, 82; 340/635, 500, 514, 815.4, 815.45; 361/683, 681

[56] References Cited

U.S. PATENT DOCUMENTS

| | | | |
|---|---|---|---|
| 4,550,278 | 10/1985 | Yamanaka | 318/632 |
| 4,613,269 | 9/1986 | Wilder et al. | 364/513 |
| 4,685,124 | 8/1987 | Smitt et al. | 379/95 |
| 4,718,082 | 1/1988 | Parker et al. | 379/98 |
| 4,727,491 | 2/1988 | Culley | 364/200 |
| 5,005,151 | 4/1991 | Kurkowski | 364/900 |
| 5,088,051 | 2/1992 | Forsythe et al. | 395/117 |
| 5,115,225 | 5/1992 | Dao et al. | 340/584 |
| 5,121,113 | 6/1992 | Kedge et al. | 340/712 |
| 5,157,701 | 10/1992 | Parker | 377/39 |
| 5,172,314 | 12/1992 | Poland et al. | 364/401 |
| 5,185,881 | 2/1993 | Brooks et al. | 395/575 |
| 5,233,337 | 8/1993 | Takahashi | 340/782 |
| 5,233,347 | 8/1993 | Dahl et al. | 340/825.68 |

OTHER PUBLICATIONS

"SmartVu™" as described in the User Manuals for the Dell™ 486D Systems; 1988–1992.

*Primary Examiner*—David E. Harvey
*Attorney, Agent, or Firm*—Stuart T. Auvinen

[57] ABSTRACT

A front-panel display of a PC has several 7-segment light-emitting diode (LED) displays. A serial link is provided from an I/O port on the PC motherboard to the front panel display. This serial link uses the turbo-in line that is normally used to light the turbo LED indicator. A microcontroller on the front-panel display samples the turbo-in line and extracts serial data once a start sequence is detected. The serial data is converted to parallel form, and then encoded into a code that can be decoded by the 7-segment LED displays. The microcontroller drives this code to the 7-segment displays so that the serial data from the I/O port on the PC motherboard is displayed by the 7-segment displays on the front panel. Software on the PC periodically writes to the I/O port to update the data bit transmitted. This software can thus alter the front panel display. Information displayed on the front panel can include the temperature of the CPU or power reduction in suspend modes. The display can be made to blink to alter the user when a critical temperature has been reached. Attributes may be sent with the serial data to designate that the display be blinked. Since the amount of data transmitted is small and not critical, the transmission is quick and causes the turbo Led to flicker only briefly.

20 Claims, 3 Drawing Sheets

FRONT-PANEL INDICATOR USING A SERIAL LINK FOR A PC

BACKGROUND OF THE INVENTION

1. Field of the Invention

This invention relates to personal computers, and more particularly to a front panel display for a personal computer.

2. Description of the Related Art

Personal computers (PC's) have become immensely popular. These PC's were originally manufactured by International Business Machines Corp. (IBM) of Armonk, N.Y., but are now made by many vendors. These PC's typically have a keyboard, monitor, and a main chassis or "box" that houses the central processing unit (CPU), which is mounted on a main or motherboard. This main chassis is also referred to as the system unit.

While most information is displayed to the user on the monitor, most PC's also have a small display on the front of the system unit. This small front-panel display consists of a few light-emitting diodes (LEDs). Small LEDs indicate if the power is on, if the hard disk is being accessed, and if "turbo mode" is active. While these small LEDs can only indicate on or off, a few digits of numerical information can also be displayed by 7-segment LED matrixes. Many PC's have two such digits, allowing for display of the speed of the PC, in MegaHertz (MHz). For example, a 33 MHz PC may have a front-panel display showing "33", while a 90 MHz PC would display "90".

More recent PC's have a "turbo" button on the front panel. This button activates "turbo mode". Turbo mode is misnamed because it slows down the PC. It is sometimes called "de-turbo mode" to more accurately describe its function. Turbo mode is needed to slow fast PC's down so that older software that uses timing loops may appear to run at the proper speed. Older DOS games in particular were written to display an image on the monitor for a certain period of time that was set by executing a program loop a certain number of times. While this worked for older 8 MHz PC's, a newer 90 MHz PC would display the game's image for only ⅒-th of the time that the 8 MHz PC would.

The front panel display may change to reflect the slower speed of de-turbo mode. For example, a 90 MHz PC would display "90" when operating at full speed, but "08" or "8" when operating in de-turbo mode. This gives the user an indication of the speed of the PC.

The speed of the PC may be slowed down by switching the clock to the CPU. Other ways to slow the PC down include adding wait states to certain accesses, or periodically asserting HOLD to the CPU to periodically pause operation of the program. De-turbo mode may be entered on some PC's by a hotkey combination of keyboard keys, such as CTL-ALT-+.

While the front panel display provides a convenient way to display information to the user, it remains one of the most under-utilized parts of a PC. Prior-art front panels on PC's typically can only display two numbers—the speed in MHz of the PC when at full speed and when in de-turbo mode. Jumpers are often used to select the numbers to display when in de-turbo or standard modes. However, the front panel has been restricted to displaying the speed of the PC.

What is desired is a front-panel display on a PC that displays other information to the user besides the speed of the PC. It is further desired to provide a communication link from the PC's motherboard to the front-panel display so that information from a program executing on the CPU may be sent to the front panel for display, under control of the PC's software or firmware.

SUMMARY OF THE INVENTION

A front-panel display is for a personal computer (PC) having a motherboard. A turbo indicator indicates that the PC is operating in a slowed-down de-turbo mode. A cable from the motherboard to the front-panel display has a turbo indicator line. A digit display on the front panel display has a plurality of selectably-illuminated segments. A serial-to-parallel converter converts serial data sent over the turbo indicator line into parallel data that is sent to the digit display. Thus serial data from the motherboard is sent over the turbo indicator line to the front panel for display by the digit display.

In further aspects of the front-panel display the serial-to-parallel converter is a microcontroller executing a firmware routine. The microcontroller includes an input port for receiving serial data from the turbo indicator line, an output port for parallel data sent to the digit display, and a memory for storing the firmware routine. The microcontroller translates the serial data into parallel data having a binary-coded-decimal format.

In still further aspects a software digit display program executes on a central processing unit on the motherboard. The program sequentially writes serial bits of data to a turbo output port on the motherboard, while the turbo output port drives a serial bit of data out to the turbo indicator line for transmission to the front-panel display.

In other aspects the invention includes a turbo button for controlling the speed of the PC. The turbo button signals to the motherboard that the PC enter a slowed-down de-turbo operating mode. The motherboard drives the turbo indicator line to darken the turbo indicator when the turbo button is pressed.

DETAILED DESCRIPTION

The present invention relates to an improvement in personal computers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
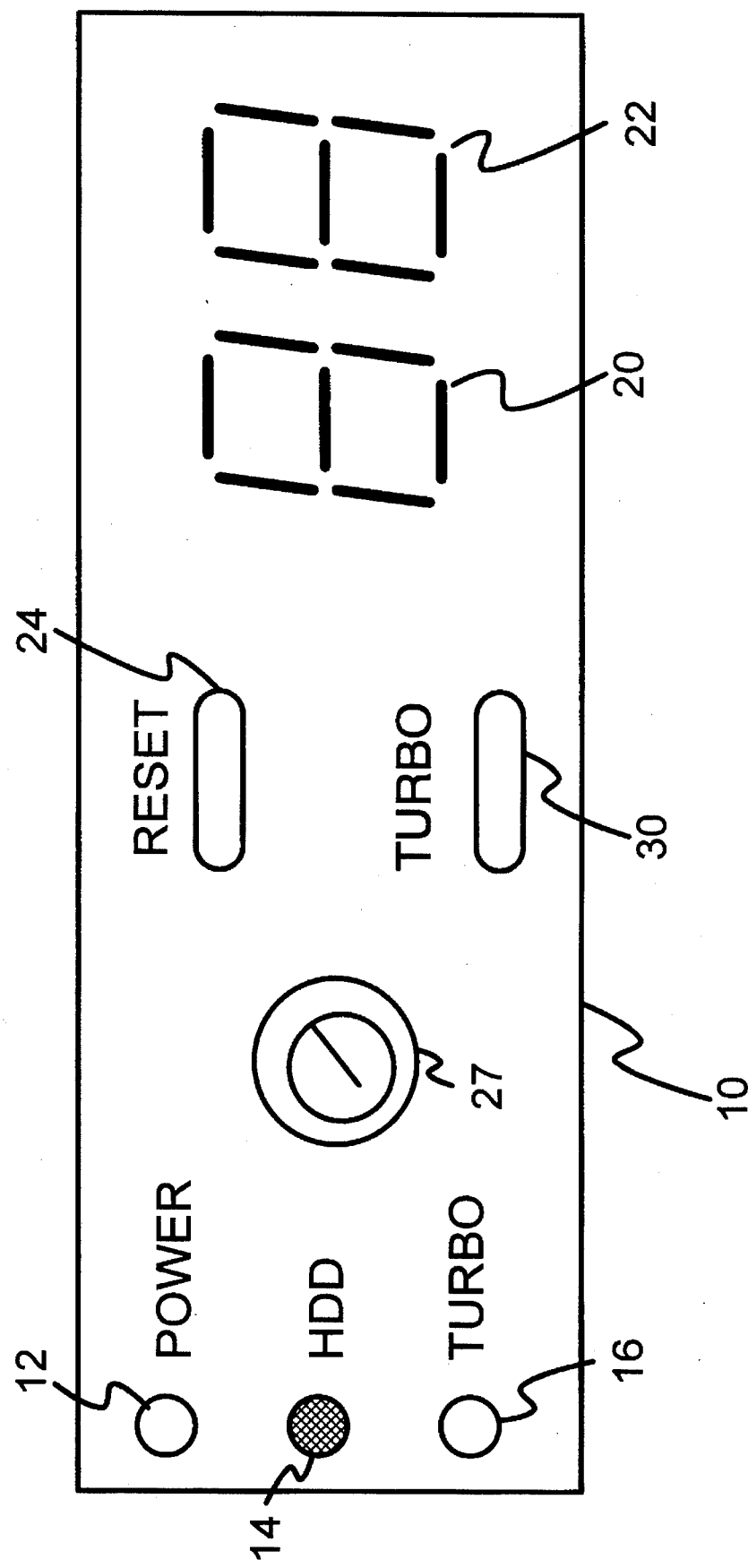
FIG. 1 is a diagram of a front panel 10 on a PC.

FIG. 1 is a diagram of a front panel 10 on a PC. Small light-emitting diodes (LEDs) are provided to indicate on or off to the user. Power LED 12 is lit when the PC is powered up. Hard-disk-drive LED 14 is lit when the hard disk drive is being accessed, and may appear to flicker as the disk is being accessed and data transferred. Turbo LED 16 is lit when the PC is operating at full speed, but is dark when the PC is in the slowed-down de-turbo mode. Keylock 27 is provided to lock the PC system with a mechanical key, preventing the PC from booting when locked.

Reset push-button 24 is pressed to restart the PC. This is known as a hard reset, one that resets all the hardware on the PC. Turbo button 30 can be pushed and locked into the "on" position, which causes the PC to run at the full speed. Pushing turbo button 30 again will release the button to the off position, and the slowed-down de-turbo mode will be selected. Turbo LED 16 will be lit shortly after turbo button 30 is pressed into the on position.

Two or more 7-segment LED displays 20, 22 are also provided. These normally display the speed, in MHz, that the PC is running at. For example, a 90 MHz PC will display a "9" on display 20 and a "0" in display 22 when in the full-speed turbo mode. When in the slowed-down de-turbo mode, display 20 will display nothing or "0" while display 22 will display "8", signifying that the PC is operating at about 8 MHz. These displays 20, 22 are used to display other information besides the speed according to the present invention. For example, the display can indicate the temperature inside the PC chassis or the temperature of a thermocouple in contact with a heat-sensitive component such as the CPU.

Figure 2:
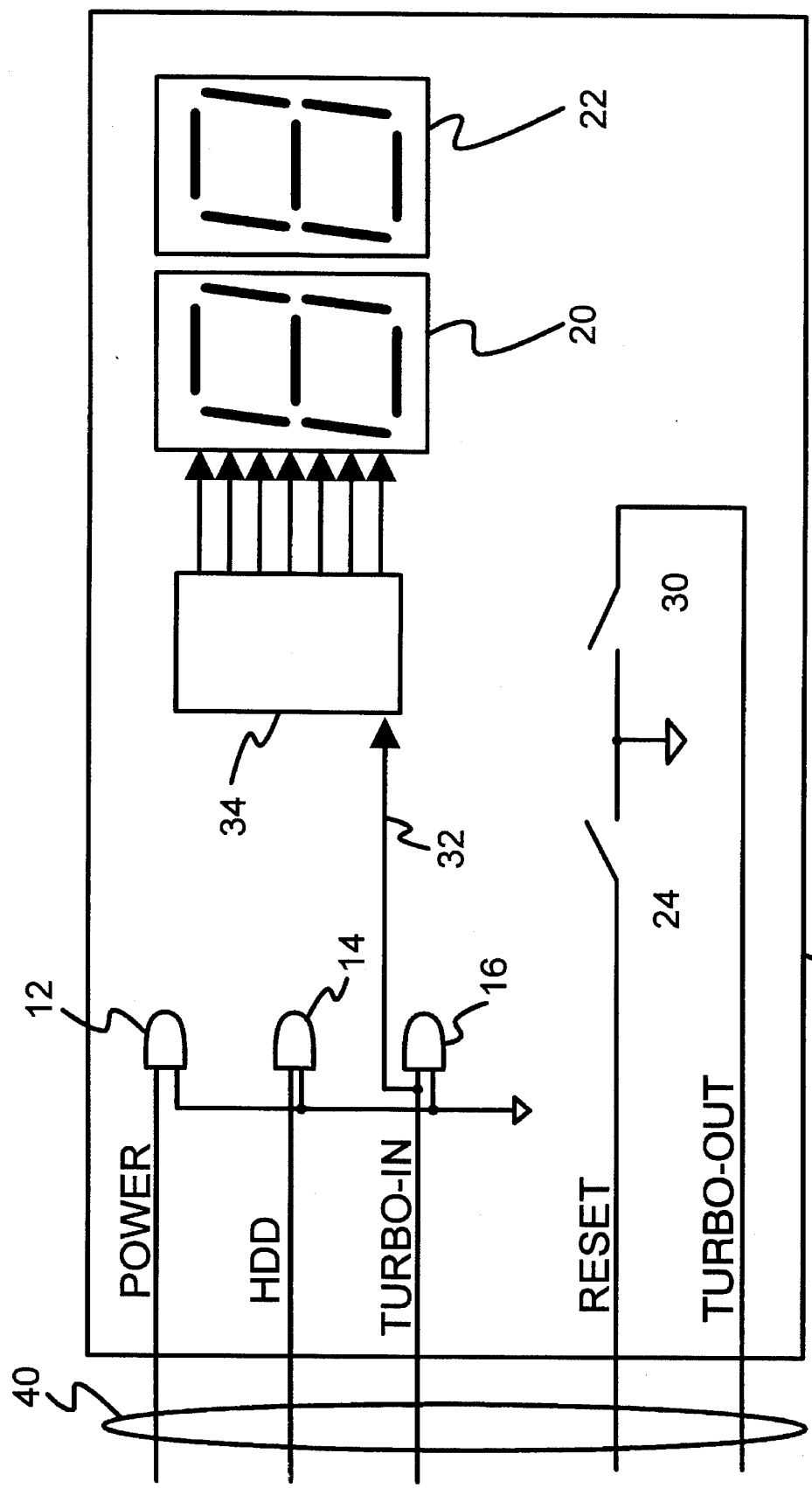
FIG. 2 is a schematic diagram of the front-panel 10.

FIG. 2 is a schematic diagram of the front-panel 10. A cable 40 connects front panel 10 to the mother board. Cable 40 includes wires for driving the power LED 12, the hard-disk-drive LED 14, and the turbo LED 16. Turbo signal 32 is driven by an input/output (I/O) port on the motherboard, while the disk-drive signal is driven by the controller for the disk drive and the power signal is driven by the power supply. A high voltage level, typically 5 volts, is applied to any of these input signals to cause one of LEDs 12, 14, 16 to illuminate. Current is returned through a ground on the front panel. Both a power and a ground signal are also supplied to the front panel through cable 40 (not shown). Alternatively, the input signal to the power LED 12 may be used as the power supply for the front panel 10.

Cable 40 also contains two outputs from front panel 10. These outputs are for the reset button 24 and the turbo button 30. Both buttons 24, 30 are connected to ground, so that when a button is pressed, the respective output signal will drop toward ground. The reset and turbo-out output signals are pulled high by a high-resistance resistor on the motherboard so that they are in a high voltage state when the buttons 24, 30 on the front panel 10 are not pressed.

The turbo-in signal 32 is also coupled to segment logic 34. Segment logic 34 receives and stores signals over turbo-in signal 32 and translates these signals into codes to drive the 7-segment displays 20, 22. Seven-segment displays 20, 22 may each be driven by 7 signals, with each of the 7 signals indicating if a corresponding segment is to be illuminated or darkened. Seven-segment displays have seven signal input for the seven segments, and one common ground.

Figure 3:
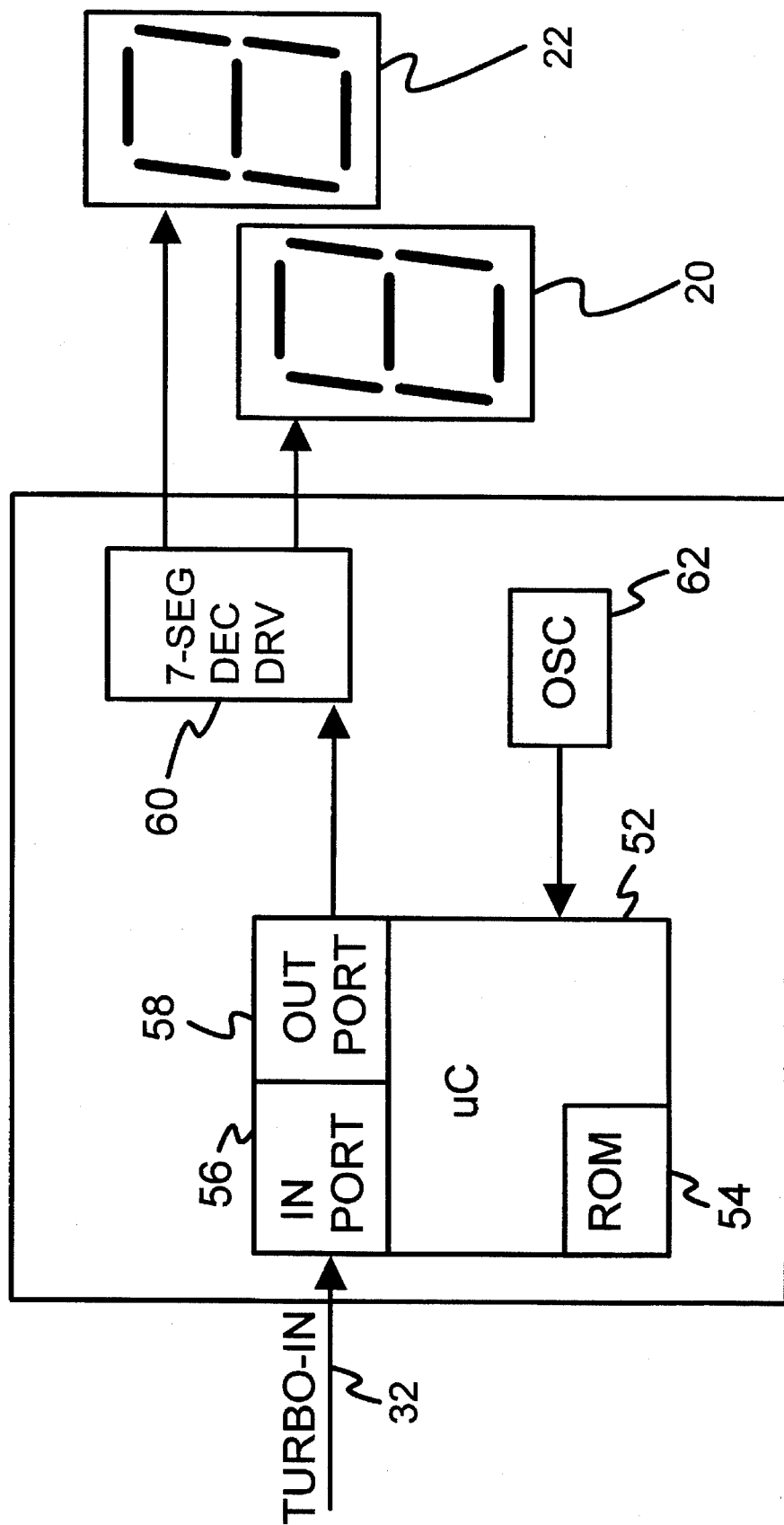
FIG. 3 shows in detail a preferred embodiment of segment driver logic.

FIG. 3 shows in detail a preferred embodiment of segment driver logic 34. In this embodiment, a microcontroller 52 is used to receive bits of information from the motherboard on turbo-in signal 32. These bits are sampled at a predetermined rate and are then stored and translated into codes to drive the 7-segment displays 20, 22. One or more 7-segment drivers 60 may be used to supply sufficient drive current to drive the 7-segment displays 20, 22. This 7-segment driver 60 is especially needed when microcontroller 52 lacks sufficient current drive on its output pins to drive 7-segment displays 20, 22. In addition to providing sufficient current drive, 7-segment driver 60 may decode a code from microcontroller 52 to a code accepted by 7-segment displays 20, 22. For example, microcontroller 52 may place two 4-bit binary-coded-decimal (BCD) codes into output port 58 that is sent to 7-segment driver 60. Seven-segment driver 60 may then translate these two 4-bit BCD codes to two sets of 7 separate signals to drive each of the 7 segments in displays 20, 22.

In practice, 7-segment driver 60 may be integrated into the same electronic component package as display 20, while a separate 7-segment driver 60 is integrated into the same electronic component package as display 22. Another possibility is that both displays 20, 22 are integrated together, with or without 7-segment driver 60.

An oscillator 62 provides a periodic clock to microcontroller 52. The clock frequency should be chosen to be a multiple of the frequency that data is sent over turbo-in signal 32. Firmware stored in read-only memory (ROM) 54 samples turbo-in signal 32 connected to input port 56. When a change in logic level is detected, a firmware routine is begun to look for a starting sequence. Input port 56 will be sampled after a fixed period that corresponds to the rate that bits are transmitted over turbo-in signal 32. The bits sampled are compared to a predetermined start sequence, and if the sequence received matches the predetermined start sequence, then reception is begun. The predetermined start sequence can be as simple as a single start bit or transition, or may consist of several bits, such as 1-0-1-0-1-0.

Once the start sequence has been received and verified, the actual data for display is received. This data can be received in several formats, but a preferred format is to simply transmit the code that will be sent to 7-segment driver 60. For example, if two BCD digits are sent to 7-segment driver 60, then two 4-bit data sequences are received over turbo-in signal 32. These 4-bit data sequences are converted from 1-bit serial format to 4-bit or 8-bit parallel format and then sent to output port 58.

Software on the PC drives the data stream out on the turbo-in line 32 by writing data to an I/O port on the motherboard. The software must write to this register periodically when transmitting so that the data may be sampled properly by the front panel. Transitions in the data stream are seen as the software writes to the I/O register. The software will only have to operate when the display is to be updated, and does not have to be loaded as a terminate-and-stay-resident (TSR) program.

The turbo LED 16 will appear to flicker when data is being transmitted from the motherboard to the front panel 10, but the flickering will be for a brief period of time. The flickering is brief since the amount of data to transfer, only about 8-bits, is small will quickly be completed.

Types of Information Transmitted to Front Panel

It is contemplated that several different types of information can be transmitted for display by the front panel. Many high-speed PC's produce more heat that in previous PC's. This heat generation problem has recently been brought to the consumer's attention by the PC press. Certain CPU's, such as the Pentium™ made by Intel Corporation of Santa Clara, Calif., are notorious for generating a great deal of heat. This has led to additional cooling fans placed directly on the hot Pentium™ CPU's. Should these fans fail, the CPU may build up too much heat and this expensive CPU could be damaged. One use for the present invention is to display on the front panel the temperature of the CPU. This can be accomplished by attaching a thermocouple to the CPU, and using an analog-to-digital converter and an input I/O port on the motherboard to read the temperature into the system. The software that reads the temperature from the I/O register would then update the front-panel display with digits representing the current temperature. Alternately, when an upper alarm limit to the temperature has been reached or exceeded, the display could be set to blink, alerting the user of impending failure.

Other types of information that could be displayed is an indication of power-down for energy-efficient PC's, such as those that comply with the Environmental Protection Agency's (EPA's) Energy Star Program. The display could indicate the percent of power reduction during the various power-down modes that Energy-Star PC's cycle through. Another use would be a timer to indicate the time left before a power-saving suspend mode is entered, or until the next level of power-saving mode is entered. The display could be blinked when only a minute or two remain to remind the lethargic user to press a key or move the mouse to prevent the suspend mode from starting.

Software that monitors and controls these power-savings modes can monitor the percentage of the system that is powered down, or the percent of power savings, which can be shown on the front-panel display. Likewise the percentage of CPU usage can be monitored and displayed.

Error codes are generated by software programs and operating systems. These programs could also write these error codes to the front-panel display. Often two seven-segment error-code displays are present on the main motherboard of a PC. The BIOS writes codes to these displays on the motherboard as the PC is booted up. These displays on the motherboard are useful for technicians when the PC crashes of hangs while booting. The two-digit code displayed indicates the last BIOS operation or routine called or completed. Thus the code can indicate where the BIOS code failed. These error codes are not useful for end users because they are located out of sight on the motherboard inside the PC chassis. The front-panel display could be used to display these error codes to the end user by monitoring the BIOS writes to the motherboard display.

While some possible uses of the front-panel display using the serial link have been presented, it is anticipated that many other uses will be devised by those of skill in the art once the means are available to modify the front-panel display with the PC's software. Thus the invention is not to be limited to any particular use of the display or type of information displayed.

ALTERNATE EMBODIMENTS

Several other embodiments are contemplated by the inventors. For example, many different protocols for serial data transmission may be used to transmit the display information over the turbo-in line. These protocols may include error detection and possibly correction of the data transmitted, or having the data transmitted multiple times to ensure that it is transmitted accurately. No return path or handshake has been provided from the microcontroller in the front panel back to the motherboard in an effort to reduce costs. However, more elaborate schemes could provide a return path using an extra wire in the cable to the front panel, or using the turbo-out signal. It is contemplated that the data transmitted is not critical since it is for display, so error detection is not critical.

While an embodiment using a microcontroller has been described, the functions performed by the microcontroller could be implemented directly in hardware using programmable logic and state machines. For high volumes of manufacture, this may be the most economical embodiment. The oscillator could be deleted if the clock could be extracted from the input data stream by well-known techniques.

The 7-segment displays could be replaced by liquid-crystal-displays (LCDs) or other simple displays. Many embodiments for the display drivers are possible. The microcontroller could periodically blink the display for added effect by allowing commands to the microcontroller to be sent over the turbo-out line as well as data for display. One of the commands could be to blink the display. A second start sequence could indicate a command rather than data, or an extra bit in the data stream could indicate command or data. Another way to blink the display would be to define an attribute bit or sequence of bits. The attribute bit could be sent immediately after the data for display, and would be interpreted by the firmware on the microcontroller. For an attribute indicating blinking, the code to the 7-segment display could be changed to all dark segments on a periodic basis to blink the display off.

Although a display using standard 7-segment LED's have been described, other displays could be used that use fewer or more segments, or arrange the LEDs into a dot-matrix, such as 5×7. However, the front panel display is not an expensive rasterized display such as the main video monitor on a PC.

The foregoing description of the embodiments of the invention has been presented for the purposes of illustration and description it is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A front-panel display system for a personal computer (PC) having a motherboard, the front-panel display system comprising:

a turbo indicator for indicating that the PC is operating in a slowed-down de-turbo mode;

a cable from the motherboard to a front-panel display, the cable having a turbo indicator line;

a digit display having a plurality of selectably-illuminated segments; and a serial-to parallel converter, for converting serial data sent over the turbo indicator line into parallel data, the parallel data being sent to the digit display, whereby serial data from the motherboard is sent over the turbo indicator line to the front panel for display by the digit display.

2. The front-panel display system of claim 1 wherein the serial-to parallel converter is a microcontroller executing a firmware routine.

3. The front-panel display system of claim 2 wherein the microcontroller includes an input port for receiving serial data from the turbo indicator line;

an output port for outputting parallel data to the digit display, and a memory for storing the firmware routine.

4. The front-panel display system of claim 3 further comprising an oscillator having a periodic clock output, the microcontroller receiving periodic clock from the oscillator.

5. The front-panel display system of claim 4 wherein the periodic clock has a frequency that is a multiple of the rate the serial data is received by the input port.

6. The front-panel display system of claim 2 wherein the microcontroller translates the serial data into parallel data having a binary-coded-decimal format.

7. The front-panel display system of claim 6 wherein the digit display has a plurality of seven selectably-illuminated segments, each selectably-illuminated segment being a light-emitting diode.

8. The front-panel display system of claim 7 wherein the motherboard transmits a start sequence before transmitting the serial data for display.

9. The front-panel display system of claim 8 further comprising a software digit display program, the program for executing on a central processing unit on the motherboard, the program sequentially writing serial bits of data to a turbo output port on the motherboard, the turbo output port driving a serial bit of data out to the turbo indicator line for transmission to the front-panel display.

10. The front-panel display system of claim 9 wherein the digit display is made to blink on and off when a blink indication is received from the software digit display program.

11. The front-panel display system of claim 10 further comprising a hard-disk indicator, the hard disk indicator being illuminated when a hard disk drive on the PC is being accessed.

12. The front-panel display system of claim 11 further comprising a turbo button, the turbo button for controlling the speed of the PC, the turbo button signaling to the motherboard that the PC enter a slowed-down de-turbo operating mode, the motherboard driving the turbo indicator line to darken the turbo indicator when the turbo button is pressed.

13. A personal computer (PC) comprising:
   a motherboard further comprising:
      a central processing unit (CPU),
      a main memory for storing programs for execution by the CPU; and
      an output port for outputting data from the CPU;
   a video monitor for displaying graphic information generated by the programs;
   a display mounted on a front panel of the PC, the display further comprising:
      a turbo indicator for indicating that the PC is operating in a slowed-down de-turbo mode;
      a cable from the output port on the motherboard to the display, the cable having a turbo indicator line;
      a segmented display having a plurality of selectably-illuminated segments; and
      a serial-to parallel converter, for converting serial data sent over the turbo indicator line into parallel data, the parallel data being sent to the segmented display,
   whereby serial data from the motherboard is sent over the turbo indicator line to the front panel for display by the segmented display.

14. The PC of claim 13 wherein the serial-to parallel converter is a microcontroller executing a firmware routine.

15. The PC of claim 14 wherein the microcomroller includes
   an input port for receiving serial data from the turbo indicator line;
   an output port for outputting parallel data to the segmented display, and
   a memory for storing the firmware routine.

16. The PC of claim 15 further comprising an oscillator having a periodic clock output, the microcontroller receiving periodic clock from the oscillator.

17. The PC of claim 16 wherein the periodic clock has a frequency that is a multiple of the rate the serial data is received by the input port.

18. The PC of claim 17 wherein the microcontroller translates the serial data into parallel data having a binary-coded-decimal format.

19. The PC of claim 18 wherein the program include a segmented display program, segmented display program for executing on the CPU on the motherboard, the segmented display program sequentially writing serial bits of data to the output port on the motherboard, the output port on the motherboard driving a serial bit of data out to the turbo indicator line for transmission to the display.

20. The PC of claim 19 wherein the segmented display is made to blink on and off when a blink indication is received from the segmented display program.

* * * * *